(12) United States Patent
Mitrovich et al.

(10) Patent No.: US 7,108,104 B2
(45) Date of Patent: Sep. 19, 2006

(54) LUBRICANT APPLICATOR

(76) Inventors: Michael J Mitrovich, 13509 61st, Ave., NE., Kenmore, WA (US) 98028; Bernard L. Boyer, 9701 W. 128th Ter., Overland Park, KS (US) 66213

( * ) Notice: Subject to any disclaimer, the term of this patent is extended or adjusted under 35 U.S.C. 154(b) by 4 days.

(21) Appl. No.: 10/310,211

(22) Filed: Dec. 5, 2002

(65) Prior Publication Data

US 2003/0101897 A1    Jun. 5, 2003

Related U.S. Application Data

(60) Provisional application No. 60/335,766, filed on Dec. 5, 2001.

(51) Int. Cl.
*B61K 3/00* (2006.01)
(52) U.S. Cl. ........................ 184/3.2; 184/15.1
(58) Field of Classification Search ................ 184/3.1, 184/3.2, 6.4, 9, 12, 15.1, 21, 45.1, 45.2, 96, 184/99

See application file for complete search history.

(56) References Cited

U.S. PATENT DOCUMENTS

| | | | | |
|---|---|---|---|---|
| 1,222,341 A | * | 4/1917 | Wholey | ...................... 184/3.2 |
| 2,489,442 A | * | 11/1949 | Whiting | ...................... 184/3.2 |
| 2,866,521 A | * | 12/1958 | Gibson | ...................... 184/3.2 |
| 2,903,090 A | * | 9/1959 | Brown et al. | ................. 184/3.2 |
| 5,251,724 A | * | 10/1993 | Szatkowski et al. | ......... 184/3.2 |
| 5,337,860 A | * | 8/1994 | Burke et al. | ................. 184/3.2 |

* cited by examiner

*Primary Examiner*—David Fenstermacher
(74) *Attorney, Agent, or Firm*—Stephen M. Nipper; Dykas, Shaver & Nipper, LLP (57) ABSTRACT

A lubricant applicator for disposing lubricant onto a metal surface. The lubricant applicator generally includes a combination holder and dispenser. Lubricant is disposed from the same portion of the combination holder and dispenser as the lubricant was inserted, in the rear portion of the combination holder and dispenser. A dispensing system applies constant force to the rear portion of the combination holder and dispenser so that lubricant is disposed from the rear portion and out of the front portion of the combination holder and dispenser. Lubricant, generally in the form of a stick, can therefore be easily replaced without removing the applicator from its location or without removing its mounting arrangement. Various applications and mounting arrangements for the lubricant applicator are disclosed, as is a method for providing a lubricant applicator.

12 Claims, 8 Drawing Sheets

LUBRICANT APPLICATOR

Applicant hereby claims priority of provisional patent application 60/335,766 filed on Dec. 5, 2001.

BACKGROUND OF THE INVENTION

For many years, there has been a desire for lubricant applicators in numerous applications, particularly involving heavy machinery or locomotives. In particular, for over fifty years railroads and transit systems have tried to reduce destructive wear to wheel flanges that occurs on various cars and parts of the system. Wear is caused when a wheel flange contacts the gauge face of the track when the car is passing through a curve and when the car moves sideways while in a straight or tangent track. Heavier loads also add increased load stress and wheel flange wear. In the prior art, the use of grease or oil applied directly to the flange of a wheel, often with a spray, has been unsatisfactory because of major maintenance problems and difficulty in controlling where the grease or oil is applied. To overcome these difficulties, solid stick lubricant applicators with constant force or coiled spring pressure have been used. However, these still require much maintenance and their reliability in withstanding a harsh working environment has not been shown. One of the problems of maintenance of these systems is that pre-existing mounting members are often attached to a locomotive car in proximity to a wheel flange. The way that existing mounting members attach a lubricant holder and dispenser, so that lubricant is dispensed from the front of a holder and dispenser, the whole holder and dispenser must be removed in order to change a lubricant stick. This is very time consuming and requires the availability of specialized tools at the scene. What is desirable, then, is a more reliable, less maintenance intensive, solid lubricant applicator that can be easily installed on a number of pre-existing or other mounting brackets.

SUMMARY OF THE INVENTION

In order to overcome problems inherent in the prior art there has been devised by the present invention a lubricant applicator that can be used in numerous applications. Many of the applications described hereinafter will refer to locomotive applications, but the present invention is useful in any application where a solid lubricant can be applied, particularly to a metal surface. Several examples of this could be crane wheels and logging drag chains. The lubricant applicator of the present invention generally comprises a combination holder and dispenser for a lubricant, having a lubricant generally in the form of a stick, inserted inside the combination holder and dispenser, whereby lubricant is disposed from the same portion of the combination holder and dispenser as the lubricant stick was inserted, in the rear portion of the combination holder and dispenser. From the rear portion of the combination holder and dispenser the lubricant is disposed out of the front portion of the combination holder and dispenser and onto a position where it will be ultimately disposed. If that position is on a locomotive, the position may be on a wheel flange as will be described hereinafter, but the position could be other positions on a train. Another example of where the lubricant can be disposed is onto heavy drive chains. A variable attaching member attaches the combination holder and dispenser to a pre-existing or other mounting member in a position in proximity to the position to where it will be disposed. The variable attaching member of the present invention varies according to the application in which it is used. A dispensing system in the form of a constant force system is in contact with the combination holder and dispenser to apply constant force to the rear portion of the combination holder and dispenser so that the lubricant, generally in stick form, is dispensed at a constant rate from the rear portion and out of the front portion of the combination holder and dispenser. The constant force system is comprised of a positioning member in the form of a spring holder and slide mechanism that holds a constant force actuator in the form of a spring. A locking member in the form of a pin, holds the spring holder and slide mechanism and spring at a constant force against the lubricant within the combination holder and dispenser. In this way, the combination holder and dispenser applies a new lubricant from the rear portion of the combination holder and dispenser and out through the front portion of the combination holder and dispenser. Furthermore, a lubricant stick can be changed without removing the combination holder and dispenser from the variable attaching member. A lubricant stick can therefore be changed quickly and conveniently without the use of any tools. A lubricant stick is changed by removing the spring holder and slide mechanism, inserting a lubricant stick and then re-positioning the spring holder and slide mechanism in place to hold the spring in place. The combination holder and dispenser, therefore, never has to be moved or removed from its position.

DESCRIPTION OF THE PREFERRED EMBODIMENTS

Figure 1:
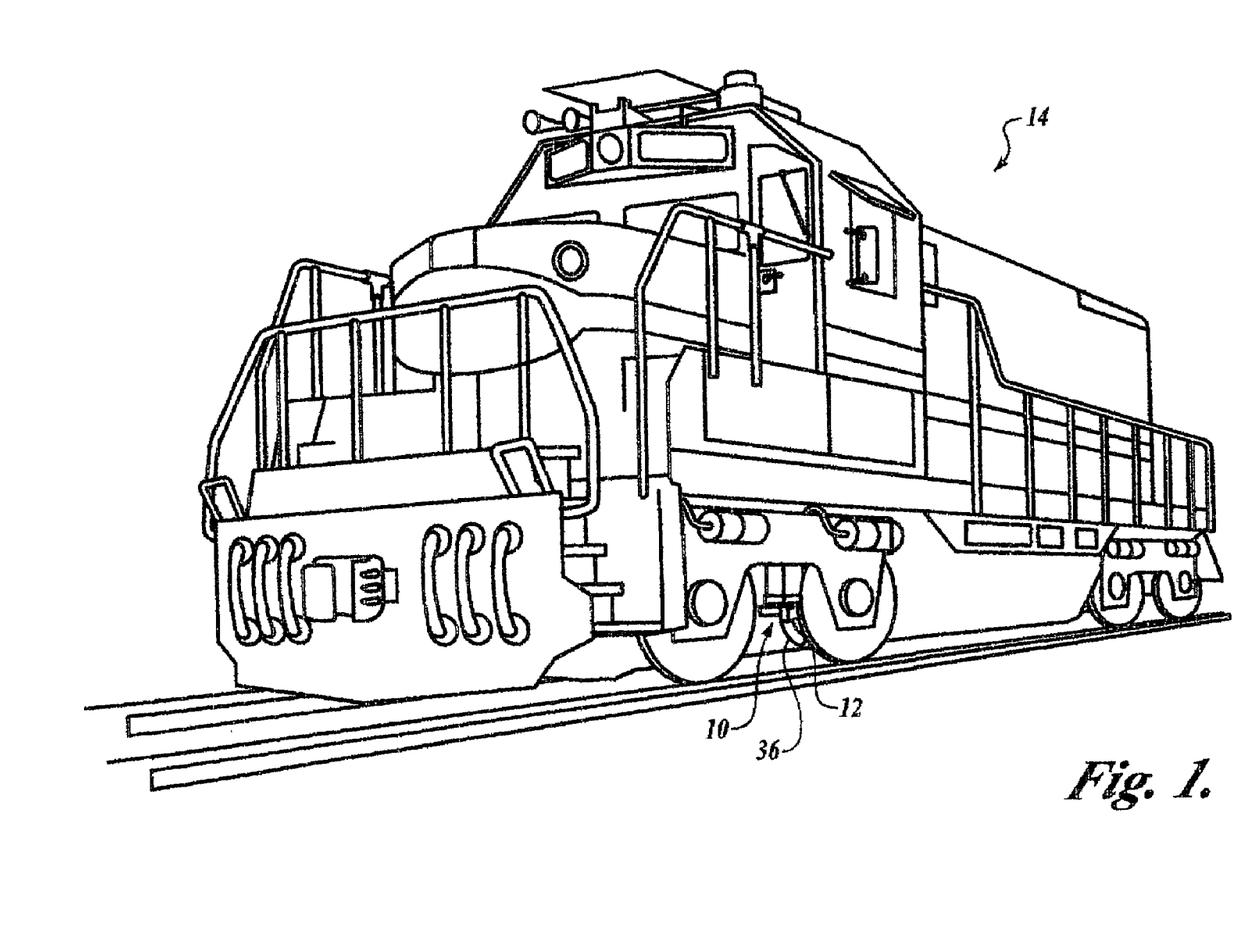
FIG. 1 is an environmental perspective view of the lubricant applicator of the present invention showing how the device is positioned, in proximity to the wheel flange of a locomotive.

Referring now to the drawings in general and in particular to FIG. 1 of the drawings, there is shown an environmental perspective view of the lubricant applicator of the present invention showing how the device is positioned in proximity to the wheel flange of a locomotive. While FIG. 1 shows the example of the present wheel flange lubricant applicator being used on a locomotive, it is to be understood that this is only an example, and the applicator of the present invention can be used in any number of other applications where a stick lubricant can be used on a metal surface, such as crane wheels and logging drag chains. Also, while the lubricant applicator of the present invention is shown used on a locomotive, it is also within the spirit and scope of the invention that it be used on a rail car.

In FIG. 1 the lubricant applicator of the present invention is shown generally by the number 10. The applicator 10 is positioned in proximity to the wheel flange 12 of the locomotive 14, as seen most clearly in FIG. 2 and as will be described in greater detail hereinafter.

Figure 2:
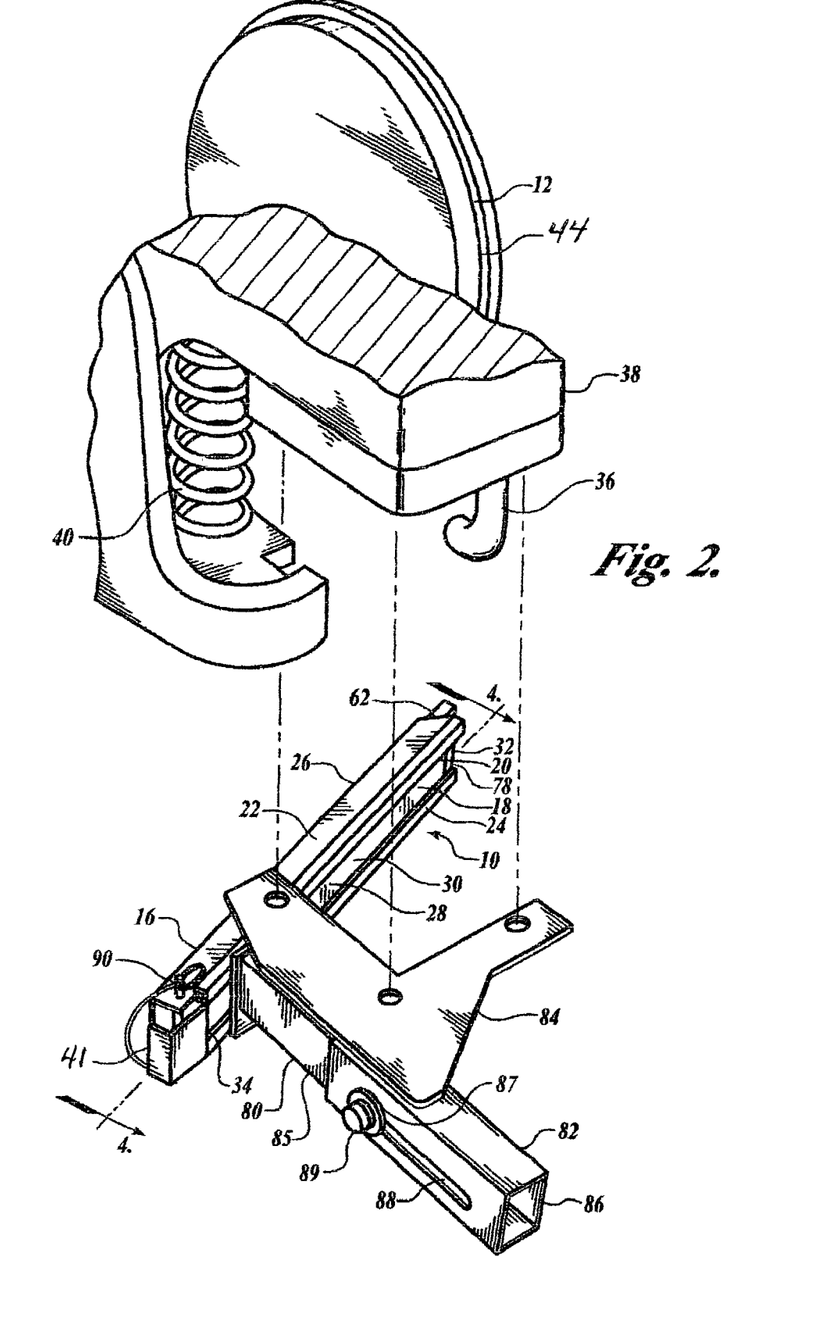
FIG. 2 is an exploded perspective view of the lubricant applicator, of the present invention, showing how the wheel flange lubricant applicator is attached to the locomotive.

Referring now to FIG. 2 of the drawings, there is shown an exploded perspective view of the lubricant applicator of the present invention, showing the example of the lubricant applicator being attached to a locomotive. It is also within the spirit and scope of the invention to mount the lubricant applicator, as shown in any of the hereinafter described examples, to a box car or other rail car (not shown).

The present lubricant applicator 10 in general, comprises a combination holder and dispenser 16, having a lubricant, generally in the form of a stick 18, positioned in the inside 20 of the combination holder and dispenser 16. The combination holder and dispenser 16 is generally a three-sided rectangle, having a top 22, a bottom 24, and a first closed side 26. The second side 28 of the combination holder and dispenser 16 forms an open side 30 of the rectangle. The rectangle also has a first front open end 32 and a second rear open end 34.

Figure 5:
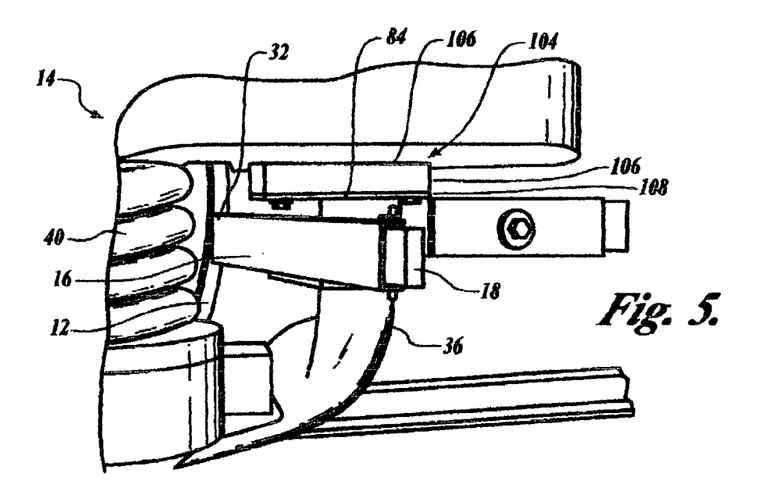
FIG. 5 is a perspective view of the lubricant applicator of the present invention when the applicator is attached to a rail car using a pre-existing mounting bracket that also mounts a sand tube to the rail car.

FIG. 2 shows an embodiment wherein the lubricant applicator 10 is attached in proximity to wheel flanges 12 in a location that also carries a sand tube 36, as shown and described in greater detail in reference to FIG. 5. FIG. 2 shows a portion of the truck 38 of the locomotive 14 and a suspension spring 40 for the locomotive 14, as seen in FIG. 1.

Figure 3:
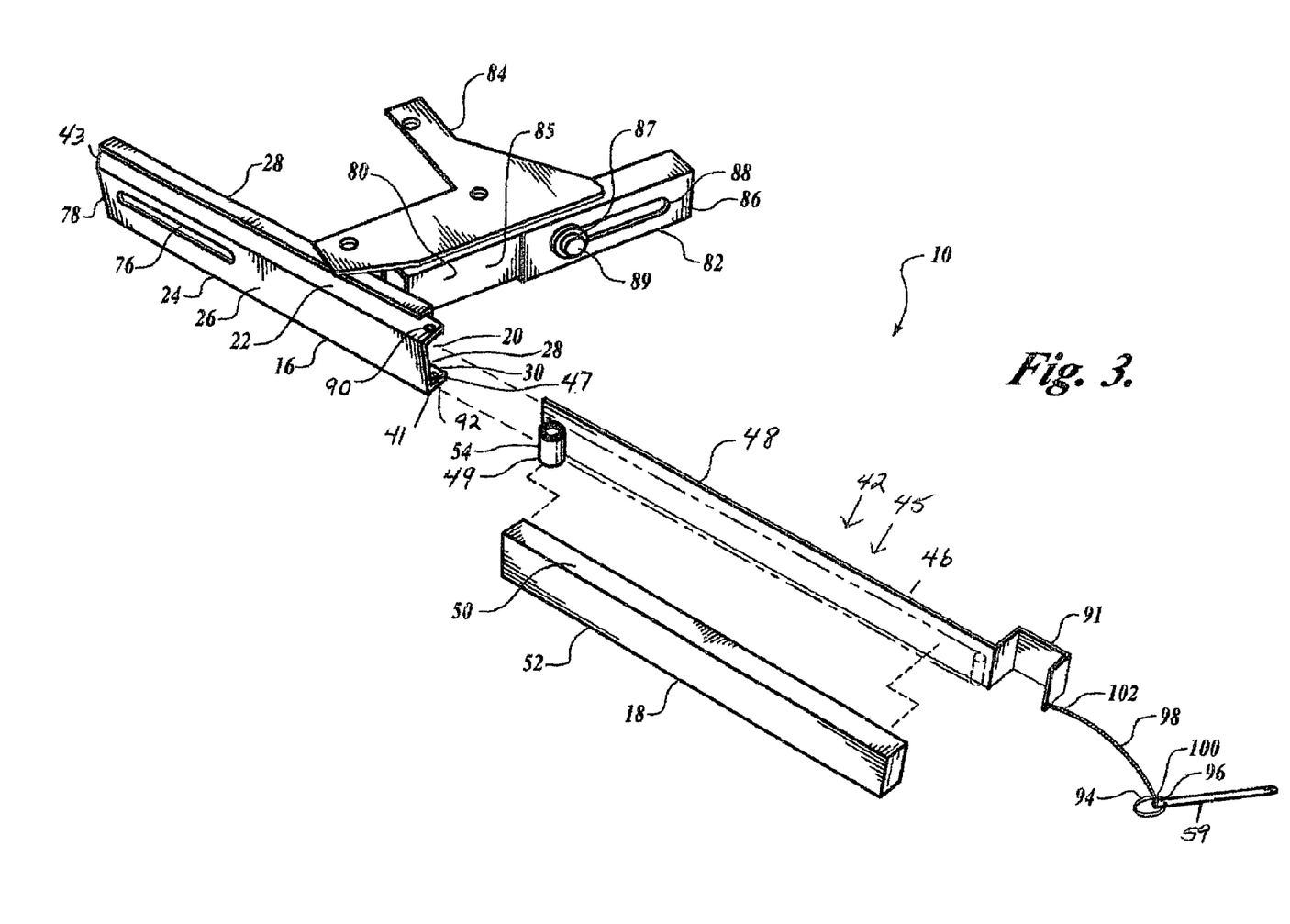
FIG. 3 is an exploded perspective view of the lubricant applicator of the present invention, showing the various parts on the inside of the combination holder and dispenser.
Figure 4:
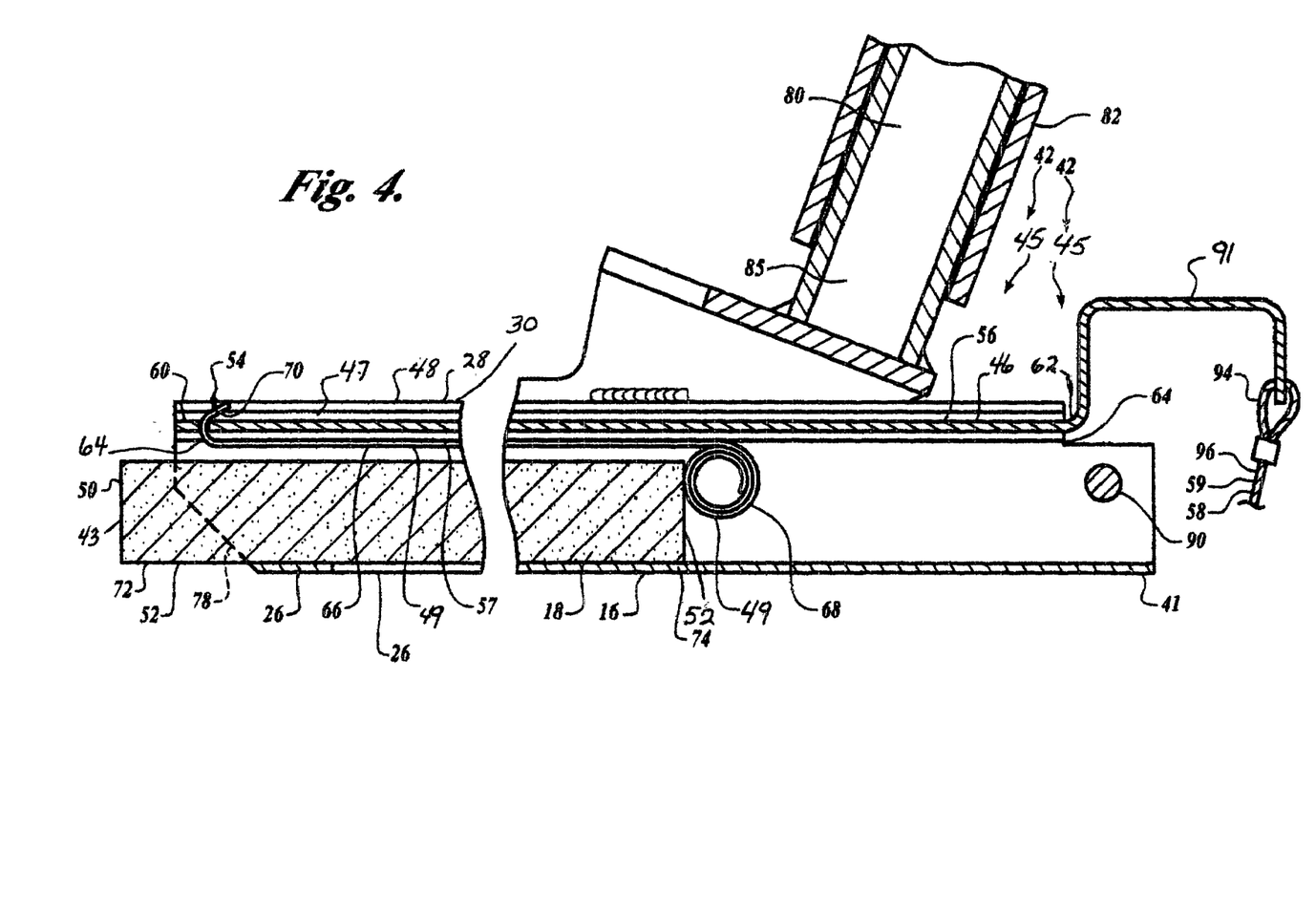
FIG. 4 is a longitudinal cross section view, taken along line 4—4 of FIG. 2, also showing the inside of the combination holder and dispenser of the lubricant applicator of the present invention and showing how the applicator is attached to a pre-existing mounting bracket on a rail car.

Referring now to the FIG. 3 of the drawings there is shown an exploded perspective view of the lubricant applicator of the present invention, showing the various parts on the inside 20 of the combination holder and dispenser 16. In the present invention in its broadest terms, it is only necessary that the lubricant be disposed from the same portion of the combination holder and dispenser 16 as the lubricant stick 18 was inserted, in the rear portion 41 of the combination holder and dispenser 16, by any form of dispensing system 42. The dispensing system 42 pushes lubricant from the rear portion 41 of the combination holder and dispenser 16 out the front portion 43 of the combination holder and dispenser 16 onto a position 44 where lubricant will be disposed. In the example as shown in FIG. 2, that position 44 would be on a wheel flange 12. The present lubricant applicator uses a constant force system 45 as a dispensing system, as will be described hereinafter with reference to FIG. 4. The constant force system 45 as described is only an example of the dispensing system 42 of the present invention, and it is within the spirit and scope of the present invention to use any other dispensing system 42. A spring holder and slide mechanism 46 slides into a slotted channel 47 in the open side 30 on the second open side 28 of the combination holder and dispenser 16, the spring holder and slide mechanism 46 thereby forming a fourth side 48, replacing the open side 30, of the combination holder and dispenser 16, as seen most clearly in FIG. 4. The spring holder and slide mechanism 46 and the constant force spring 49 sit in the channel 47 on the second open side 30 of the combination holder and dispenser 16. Thus, when the constant force spring 49 is unrolled, it sits in the channel 47 and does not come in contact with the sides 50 and 52 of the lubricant stick 18, as seen in FIG. 4. This prevents the lubricant stick 18 from rubbing against the side 54 of the constant force spring 49, also as seen most clearly in FIG. 4, thereby avoiding the premature breaking of the spring 49.

Referring now to FIG. 4 of the drawings there is shown a longitudinal cross sectional view, taken along line 4—4 of FIG. 2, also showing the inside of the combination holder and dispenser 16. In FIG. 4 it can be seen that in general, a dispensing system 42 in the form of a constant force system 45 is comprised of a positioning member 56 in the form of the spring holder and slide mechanism 46 that holds a constant force actuator 57 in the form of the constant force spring 49.

A locking member 58 in the form of a pin 59 holds the spring holder and slide mechanism 46 and constant force spring 49 at a constant force against the lubricant stick 18 within the combination holder and dispenser 16. In this way, the combination holder and dispenser 16 applies new lubricant pushed forward from the rear portion 41 of the combination holder and dispenser 16 and out of the front portion 43 of the combination holder and dispenser 16. The spring holder and slide mechanism 46 has a forward end 60 positioned at the front portion 43 of the combination holder and dispenser 16 and a back end 62 positioned at the rear portion 41 of the combination holder and dispenser 16. A slot 64 at the forward end 60 of the spring holder and slide mechanism 46 allows the constant force spring 49 to be attached to the front portion 43 of the spring holder and slide mechanism 46. The constant force spring 49 has a flat end 66 and a coiled end 68. At the flat end 66 of the constant force spring 49 there is a tab 70, the tab 70 being inserted into the slot 64 on the forward end 60 of the spring holder and slide mechanism 46 to thereby attach the constant force spring 49 to the spring holder and slide mechanism 46 before the spring holder and slide mechanism 46 is inserted into the combination holder and dispenser 16. The lubricant stick 18 has a forward portion 72 and a rearward portion 74, the forward portion 72 of the lubricant stick 18 is pushed into the rear portion 64 of the combination holder and dispenser 16, then the spring holder and slide mechanism 46 is inserted behind the combination holder and dispenser 16. The combination holder and dispenser 16 is never moved from its location and is never removed from its position in proximity to a position 44 where lubricant will be disposed. In the example as shown in FIG. 2, the position 44 is on a wheel flange 12. The coiled end 68 of the constant force spring 49 pushes against the rearward portion 74 of the lubricant stick 18 at a constant force against the lubricant stick 18. The lubricant stick 18 thereby presses against a position 44, for example a wheel flange 12 at a constant force in a consistent manner, and applies lubricant to a position 44 or a wheel flange 12, as seen most clearly in FIG. 2. In the first closed side 26 of the combination holder and dispenser 16, in proximity to the front portion 43 of the combination holder and dispenser 16 there is a window 76 in the side 26 of the combination holder and dispenser 16 that allows a maintenance person to see how much of the lubricant stick 18 remains, as seen in FIG. 3. At the front portion 43 of the combination holder and dispenser 16, the opening 78 is angled so that the combination holder and dispenser 16 can come close to the position 44 or wheel flange 12 without touching it, as seen most clearly in FIGS. 2 and 3. Positioned at the second open side 30 of the combination holder and dispenser 16 is an attaching member 80 in the form of a rectangular tube 82 adapted to receive an intermediate variable attaching member 84 for attaching the combination holder and dispenser 16 in proximity to the position 44 or wheel flanges 12, as seen most clearly in FIGS. 2 and 3, and as will be described in greater detail hereinafter. With minor modifications the intermediate variable attaching member 84 of the present invention can be altered to accommodate a variety of pre-existing mounting members, as will also be described in greater detail hereinafter. As seen in FIG. 3, the attaching member 80 has a first portion 85 and a second portion 86, whereby the first portion 85 slides into the second portion 86. The first portion 85 of the attaching member 80 has a hole 87 and the second portion 86 has a slot 88. A nut and bolt combination 89 is positioned through the hole 87 in the first portion 85 of the attaching member 80 and through to the slot 88 in the second portion 86 to secure and position the attaching member 80 at a desired variable distance relative to the lubricant applicator 10 and its attachment to a locomotive 14. The hole 87 in the first portion 85 of the attaching member 80 is not directly visible in the drawings but is behind the bolt and nut combination 89.

In operation then, when it is desirable to change the lubricant stick 18 on the present wheel flange lubricant applicator 10, the pin 59 is removed, the u-shaped handle 91 of the spring holder and slide mechanism 46 is pulled backward from the second rear end 62 of the combination holder and dispenser 16, as seen most clearly in FIG. 4. As the spring holder and slide mechanism 46 is pulled backwards from the rear portion 41 of the combination holder and dispenser 16, the flat end 66 of the coil spring 49 is rolled back up into a coiled position and pulled backward also. The spring holder and slide mechanism 46 is then removed from the combination holder and dispenser 16, a new lubricant stick 18 is pushed into the combination holder and dispenser 16, and the spring holder and slide mechanism 46 is then reinserted into the rear portion 41 of the combination holder and dispenser 16 behind the lubricant stick 18; the pin 59 is positioned through two holes 90 and 92 in the rear portion 41 of the combination holder and dispenser 16, thus securing the spring holder and slide mechanism 46, as seen most clearly in FIG. 3. The present lubricant applicator 10 thereby allows for the fast and easy replacement of a lubricant stick 18 through the second rear portion 41 of the combination holder and dispenser 16. Thus, the combination holder and dispenser 16 does not need to be moved or removed from its position on the locomotive or rail car in order to change the lubricant stick 18.

While it is somewhat unlikely to occur, if the uncoiled constant force spring 49 tends to coil back up, it is possible that the spring holder and slide mechanism 46 could accidentally eject out of the second rear portion 41 of the combination holder and dispenser 16. In order to avoid this, a metal ring 94 is attached to the top 96 of the pin 59. A wire 98 having two ends 100 and 102, has its first end 100 attached to the metal ring 94 and its second end 102 securely attached to the u-shaped handle 91 of the spring holder and slide mechanism 46, holding the spring holder and slide mechanism 46 in place, as seen most clearly in FIG. 3. The spring holder and slide mechanism 46 is thereby prevented from accidentally ejecting from the rear portion 41 of the combination holder and dispenser 16.

The lubricant applicator 10 as described above has been adapted to attach to a variety of positions in proximity to a position where lubricant will be disposed. It is within the spirit and scope of the invention to attach it to any number of locations or positions. That which is described hereinafter refers to various ways of mounting the lubricant applicator 10 in proximity to a wheel flange 12, as seen most clearly in FIG. 2. It is to be understood that this description should in no way limit the invention, but is used by way of examples only.

Referring now to FIG. 5 of the drawings, there is shown a perspective view of a preferred embodiment of the present invention where the lubricant applicator 10 is attached in proximity to wheel flanges 12 in a convenient location that also carries mounting hardware 104 for a sand tube 36. Sand tubes 36 take different forms on different types of trains, but in FIG. 5, the sand tube 36 is attached to a generally square shaped mounting opening 106 on the locomotive 14. In the embodiment as shown in FIG. 5, the intermediate variable attaching member 84 in the form of a mounting bracket 108 is attached to the generally square shaped mounting opening 106 for the sand tube 36, thereby attaching the combination holder and dispenser 16 generally perpendicular to the sand tube 36 and aiming the first front open end 32 of the combination holder and dispenser 16 to dispense lubricant on a wheel flange 12.

Figure 6:
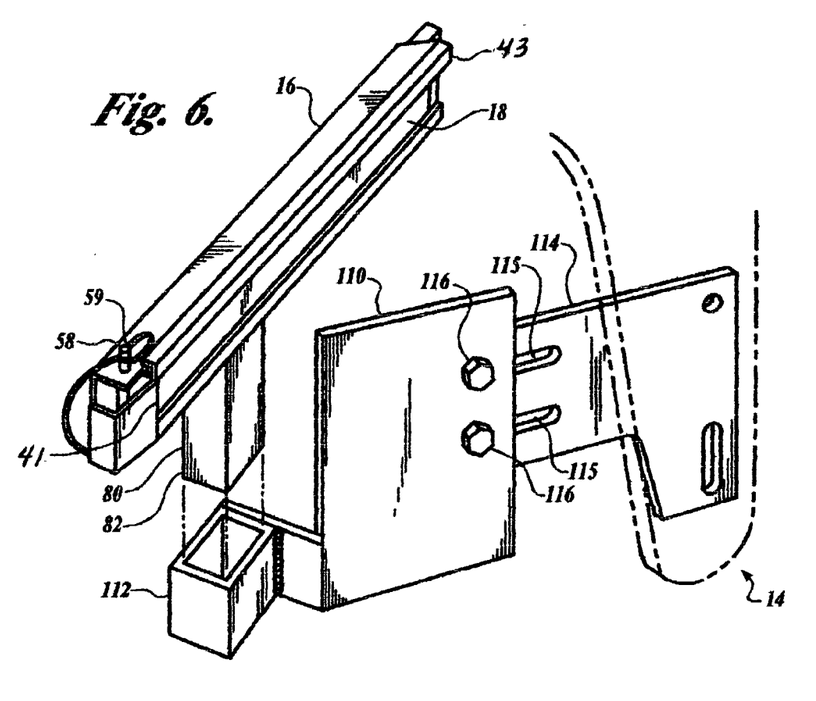
FIG. 6 is a perspective view of the applicator of the present invention showing how the applicator is attached to a pre-existing mounting bracket on a locomotive. In the embodiment shown in FIG. 6, the pre-existing mounting bracket was previously used to mount a spray type lubricant applicator to the locomotive.

Referring now to FIG. 6 of the drawings, there is shown a perspective view of the lubricant applicator of the present invention showing how the applicator is attached to a pre-existing mounting bracket on a locomotive. The attaching member 80 attaches the combination holder and dispenser 16 to an intermediate variable attaching member 110. The attaching member 80 in FIG. 6 inserts into a mating rectangular receptacle 112, unlike the embodiment shown in FIGS. 2 and 3 where the attaching member 80 includes a first 85 and a second portion 86. It is also within the spirit and scope of the embodiment shown in FIG. 6 to have the attaching member 80 and the receptacle 112 as an integral one piece unit since it is unnecessary to remove the attaching member 80 from the receptacle 112 or from a pre-existing mounting bracket 114 when the lubricant stick 18 is being replaced through the rear portion 41 of the combination holder and dispenser 16. In the prior art, lubricant applicators that sprayed lubricant onto the wheel flanges 12, were used. These spray on lubricants were attached to the locomotive 14 with a pre-existing mounting bracket 114, as seen in FIG. 6. This pre-existing mounting bracket 114 then can be attached to the intermediate variable attaching member 110 as shown in FIG. 6, such that the combination holder and dispenser 16 is attached to the locomotive 14 in a position where the front portion 43 of the combination holder and dispenser 16 is aimed at a position 44 or wheel flange 12, as seen most clearly in FIGS. 2 and 5. The intermediate variable attaching member 112 in FIG. 6 is therefore different than the intermediate variable attaching member 84 in FIGS. 2 and 3. If it is desired to attach a combination holder and dispenser 16 as seen in FIG. 6 and there is no pre-existing mounting bracket 114, a similar mounting bracket can be installed on the locomotive 14, as seen in FIG. 1, the new mounting bracket 112 would be adapted to receive the intermediate variable attaching member 110. In FIG. 6 it can be seen that the pre-existing mounting bracket 114 has at least one slot 115 adapted to receiving a nut and bolt combination 116 of the intermediate variable attaching member 110.

Figure 7:
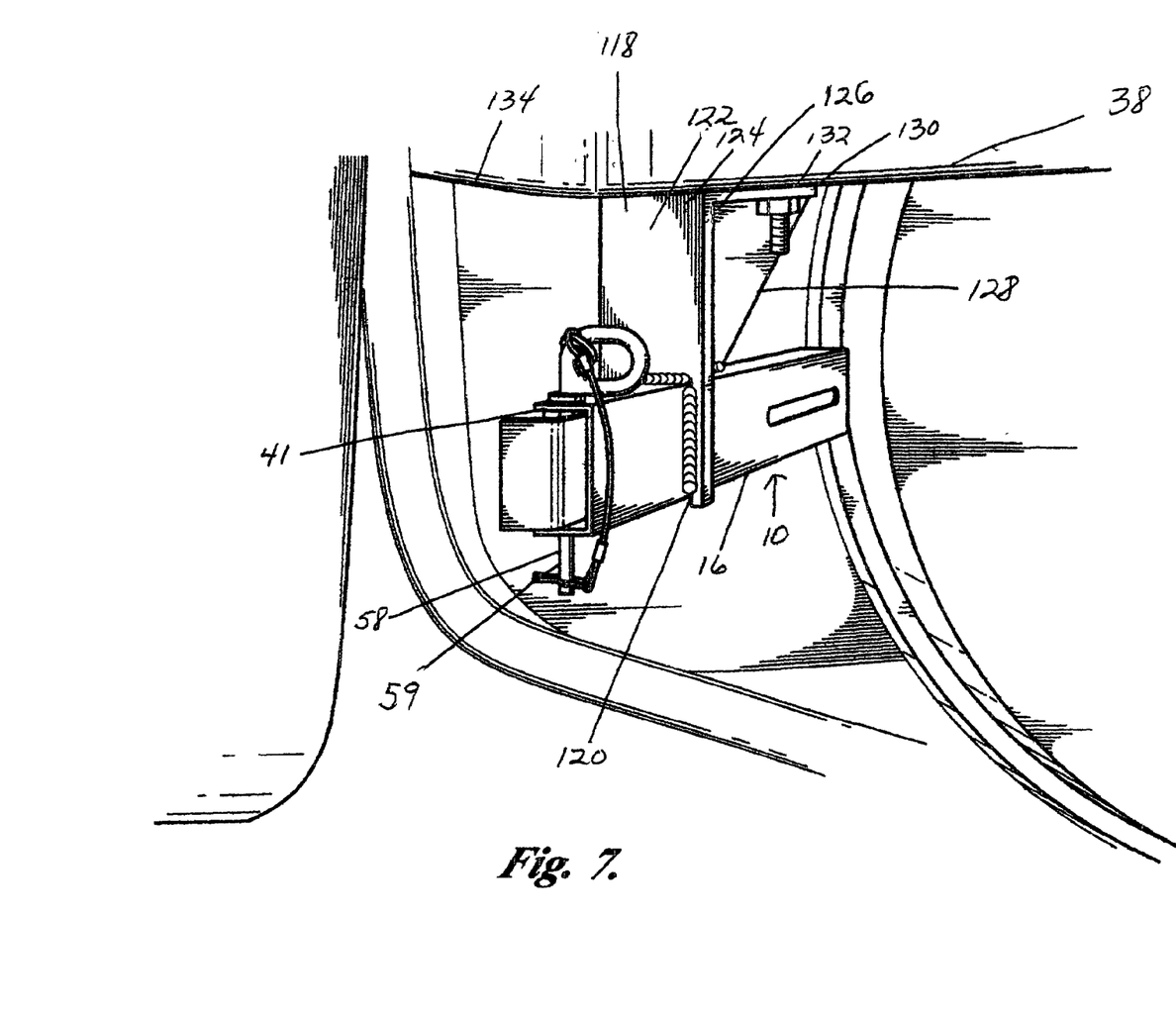
FIG. 7 is a perspective view of the lubricant applicator of the present invention showing how the applicator is attached to a railroad truck by a mounting bracket so that the applicator disposes lubricant onto a wheel flange.

Referring now to FIG. 7 of the drawings there is shown a perspective view of the lubricant applicator of the present invention showing how the applicator is attached to a railroad truck by a mounting bracket, so that the applicator disposes lubricant onto a position 44 or a wheel flange 12. There are many different types of train trucks. The lubricant applicator 10 of the present invention could be attached to any of them and the attachment arrangement as shown in FIG. 7 is an example only. In the example shown in FIG. 7 the combination holder and dispenser 16 is attached to the truck 38 of a locomotive 14. As with the other examples, it is also within the spirit and scope of the present invention to mount the combination holder and dispenser 16 to the truck of a box car or other rail car (not shown). In FIG. 7 it can be seen that the combination holder and dispenser 16 is attached to the truck 38 of a locomotive 14, as seen in FIG. 1, by the mounting bracket 118. The same locking member 58 in the form of a pin 59 that is used in the previously described applications is also used in FIG. 7. The mounting bracket 118 is generally a flat, L-shaped configuration, having a slot 120 in the vertical portion 122 of the L-shape 124 that holds the combination holder and dispenser 16 after the combination holder and dispenser 16 is positioned in the slot 120, the combination holder and dispenser 16 is welded fixedly in place. Within the right angle 126 of the L-shape 124 there is positioned a triangularly shaped brace 128 to reinforce the L-shape 124 and to keep the mounting bracket 118 from bending. The horizontal portion 130 of the L-shape 124 is fixedly attached to the bottom 132 of the truck frame 134 of the locomotive 14.

Figure 8:
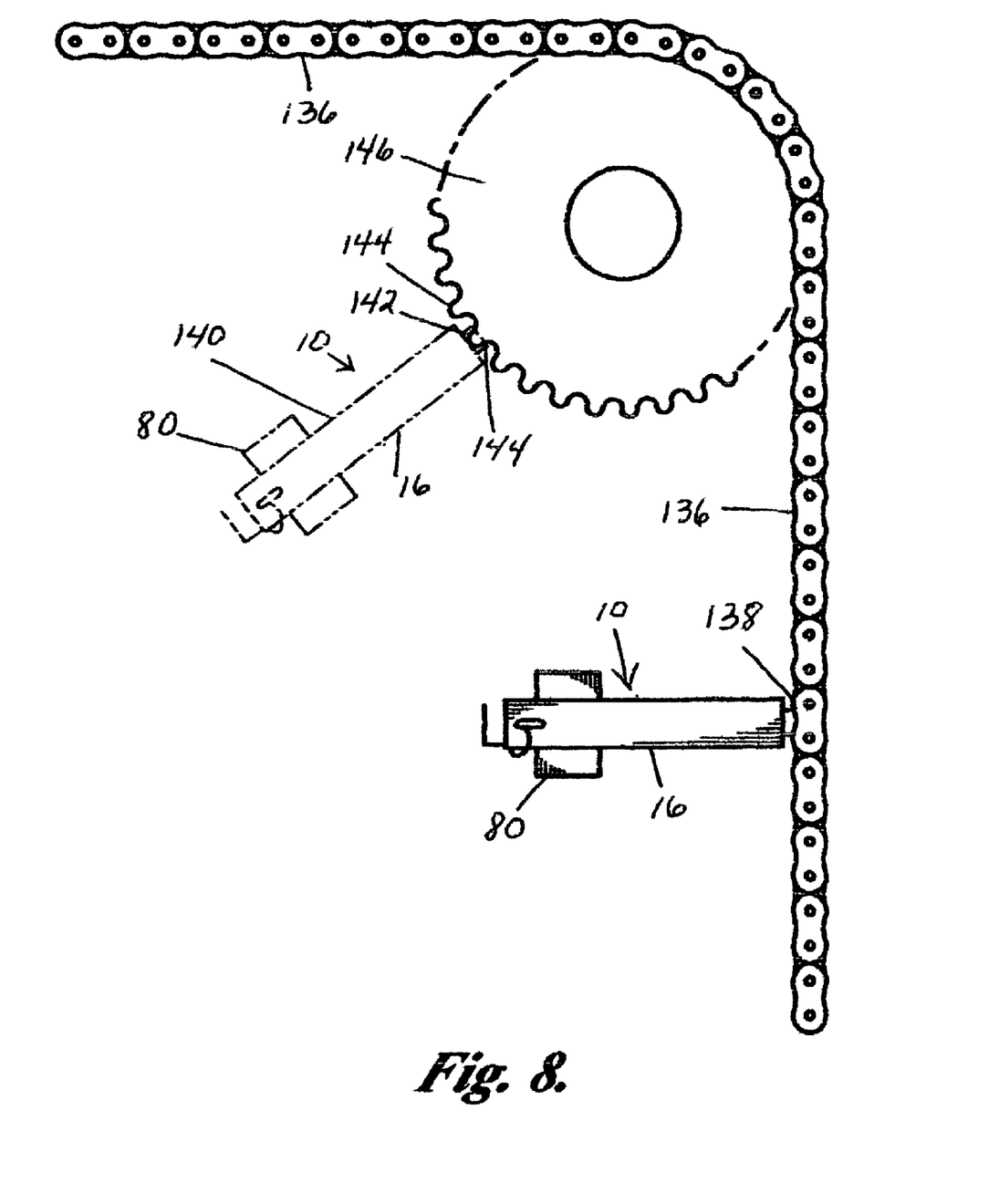
FIG. 8 is a schematic view of an example of the lubricant applicator of the present invention being used to lubricate heavy duty chain.

Referring now to FIG. 8 there is shown a schematic view of an example of the lubricant applicator 10 of the present invention being used to lubricate heavy duty chain 136. In FIG. 8 the lubricant applicator 10 is shown lubricating chain 136 at a position 138 where the chain 136 would be moving under the lubricant applicator 10 in any kind of heavy machinery application. Also, in FIG. 8, in dashed lines, there is shown an alternative application 140 wherein the lubricant applicator 10 is at a position 142 to lubricate the teeth 144 of a sprocket 146. In FIG. 8, the attaching member 80 can be attached to any location to position the lubricant applicator 10 where it should be positioned to properly dispose lubricant.

Figure 9:
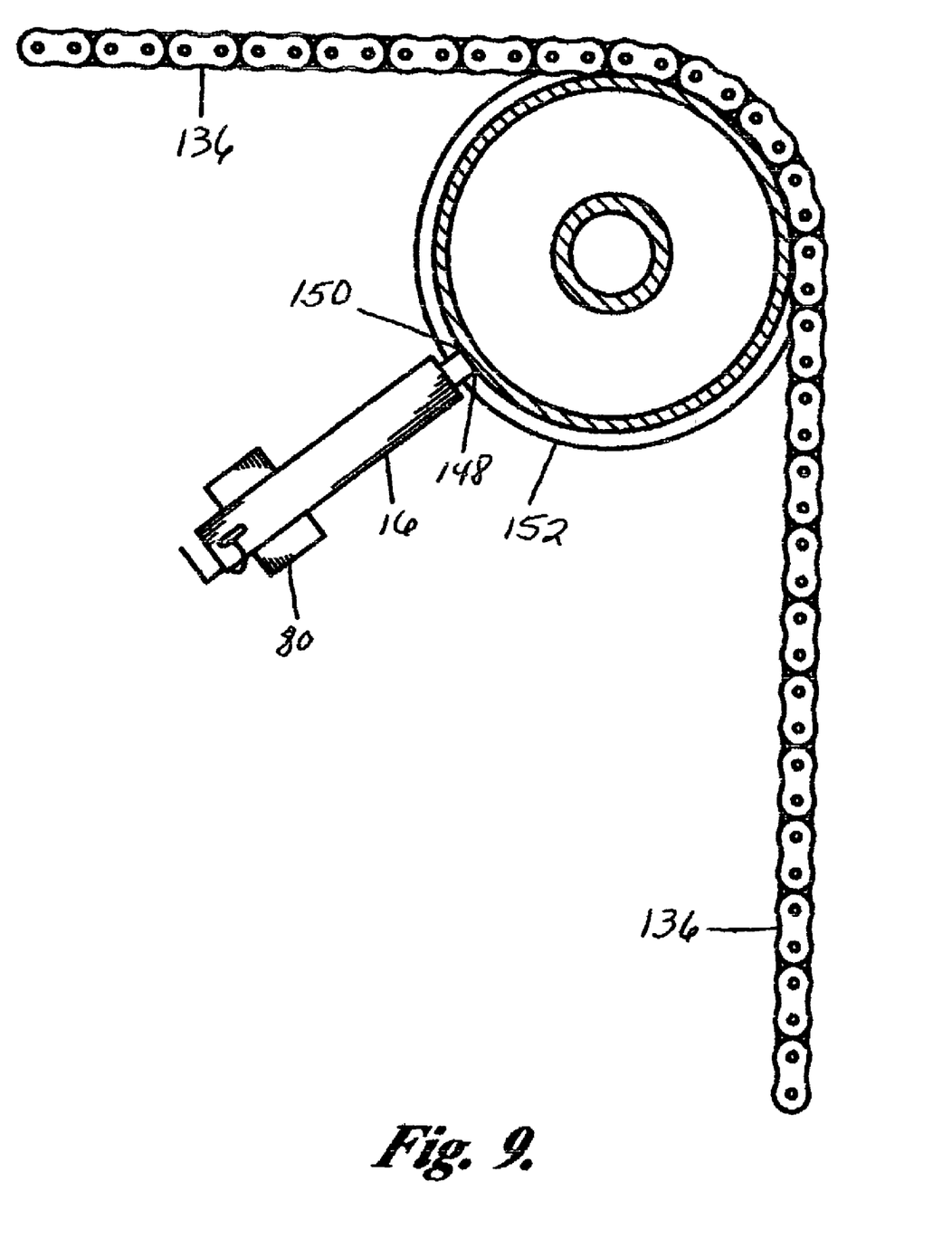
FIG. 9 is a sectional schematic view of another example of the lubricant applicator of the present invention being used also to lubricate heavy duty chain.

Referring now to FIG. 9 there is shown a sectional schematic view of another example of the lubricant applicator 10 of the present invention being used also to lubricate heavy duty chain 136. In FIG. 9 the lubricant applicator 10 is shown at a position 148 lubricating the channel 150 of a pulley 152 as chain 136 is moved along the channel 150 in any heavy machinery application. In the application as shown in FIG. 9 it would also be obvious to substitute the chain lubricating position 138 as shown in FIG. 8, for the pulley 152 and chain 136 application as seen in FIG. 9. In FIG. 9 also, the attaching member 80 can be attached to any location to position the lubricant applicator 10 where it should be positioned to properly dispose lubricant.

All of the applications shown and described are examples only and it is within the spirit and scope of the present invention to lubricate other metal surfaces in other applications.

A method for providing a lubricant applicator is also disclosed whereby a combination holder and dispenser is provided, the combination holder and dispenser has lubricant positioned within its rear portion; a dispensing system is provided for pushing lubricant from the rear portion of the combination holder and dispenser through the front portion of the combination holder and dispenser; and an attaching member is provided to attach the combination holder and dispenser in proximity to a position to where it will be disposed.

The foregoing description of the present invention has generally been described used on a locomotive and attached to the locomotive in various configurations. It is within the spirit and scope of the invention, however, that the lubricant applicator 10 of the present invention be used in other applications, on rail cars, or on other types of locomotives or rail cars than those shown herein.

While there has been accomplished by the applicant's invention all of the objects and advantages of the invention, nevertheless, variation in the structure of the invention and the arrangement of the various parts are within the spirit and scope of the applicant's invention. The embodiments given have been given only by way of illustration and the applicant is not to be limited to the embodiments shown and described.

Having described our invention we claim:

1. A lubricant applicator comprising:
   a) a combination holder and dispenser for a lubricant having an inside, a side, a portion where lubricant is inserted, a rear portion, and having a lubricant positioned inside;
   b) a constant force dispensing system removably attached to the combination holder and dispenser to apply pressure to push the lubricant from the same portion of the combination holder and dispenser as the lubricant was inserted, said constant force system comprising: a positioning member for positioning a lubricant positioned within the combination holder and dispenser, a constant force actuator for initiating movement against a lubricant positioned within the combination holder and dispenser, and a locking member for holding the positioning member and constant force actuator at a constant force, wherein the locking member is a pin that holds the spring holder and slide mechanism at a constant force against the lubricant;
   c) an attaching member for attaching the combination holder and dispenser in proximity to a position where lubricant will be disposed; and
   whereby lubricant is pushed from the same portion of the combination holder and dispenser as the lubricant was inserted onto a position where lubricant is disposed thereby eliminating the need to move the combination holder and dispenser in order to add lubricant.

2. The lubricant applicator as defined in claim 1 wherein the lubricant is disposed onto a metal surface.

3. The lubricant applicator as defined in claim 1 wherein the dispensing system applies pressure to push lubricant from the rear portion of the combination holder and dispenser and the lubricant is inserted in the rear of the combination holder and dispenser.

4. The lubricant applicator as defined in claim 1 wherein the position where lubricant will be disposed is a wheel flange.

5. The lubricant applicator as defined in claim 1 wherein the positioning member is a spring holder and slide mechanism.

6. The lubricant applicator as defined in claim 1 wherein the constant force actuator is a spring.

7. The lubricant applicator as defined in claim 1 wherein the attaching member for attaching the combination holder and dispenser attaches the combination holder and dispenser in proximity to a wheel frame.

8. The lubricant applicator as defined in claim 1 wherein the attaching member for attaching the combination holder and dispenser attaches the combination holder and dispenser to a locomotive truck flange.

9. The lubricant applicator as defined in claim 1 wherein the lubricant is in the form of a stick.

10. The lubricant applicator as defined in claim 1 wherein the combination holder and dispenser further comprises a window for viewing a remaining supply of lubricant.

11. The lubricant applicator as defined in claim 10 wherein the window is in the side of the combination holder and dispenser.

12. A lubricant applicator comprising:
   a) a combination holder and dispenser for a lubricant having an inside, a side, a portion where Lubricant is inserted, a rear portion, and having a lubricant positioned inside
   b) a dispensing system removably attached to the combination holder and dispenser to apply pressure to push the lubricant from the same portion of the combination holder and dispenser as the lubricant was inserted;
   c) an attaching member for attaching the combination bolder and dispenser in proximity to a position where lubricant will be disposed
   d) an intermediate variable attaching member attaches the attaching member to a pre-existing mounting bracket for a sand tube of a locomotive; and
   whereby lubricant is pushed from the same portion of the combination holder and dispenser as the lubricant was inserted onto a position where lubricant is disposed, thereby eliminating the need to move the combination holder and dispenser in order to add lubricant.

* * * * *